US012603763B2

(12) United States Patent
Raj et al.

(10) Patent No.: US 12,603,763 B2
(45) Date of Patent: Apr. 14, 2026

(54) SYSTEMS AND METHODS FOR ENSURING EPHEMERALITY OF ENCRYPTION KEYS

(71) Applicant: QUALCOMM Incorporated, San Diego, CA (US)

(72) Inventors: Nishant Raj, Bhagalpur (IN); Ananda Kishore Parasa, Hyderabad (IN); Bedatrayee Ghosh, Raiganj (IN); Santosh Pavan Kumar Dronamraju, Hyderabad (IN); Neeraj Kumar Soni, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 18/334,560

(22) Filed: Jun. 14, 2023

(65) Prior Publication Data

US 2024/0421980 A1     Dec. 19, 2024

(51) Int. Cl.
*H04L 29/06* (2006.01)
*H04L 9/08* (2006.01)
(52) U.S. Cl.
CPC .......... *H04L 9/0822* (2013.01); *H04L 9/0861* (2013.01)
(58) Field of Classification Search
CPC ..... H04L 9/0822; H04L 9/0861; G06F 21/57; G06F 21/575
See application file for complete search history.

(56) References Cited

U.S. PATENT DOCUMENTS

| | | | |
|---|---|---|---|
| 2003/0105951 A1* | 6/2003 | Brabson | H04L 63/166 726/1 |
| 2004/0146015 A1* | 7/2004 | Cross | H04L 9/0894 370/328 |
| 2014/0089617 A1* | 3/2014 | Polzin | G06F 12/1441 711/E12.091 |
| 2019/0347213 A1* | 11/2019 | Lutz | G06F 21/602 |
| 2023/0030501 A1 | 2/2023 | Cho et al. | |
| 2023/0350583 A1* | 11/2023 | Murray | G06F 21/602 |

FOREIGN PATENT DOCUMENTS

WO     2010057312 A1     5/2010

OTHER PUBLICATIONS

International Search Report and Written Opinion—PCT/US2024/027383—ISA/EPO—Jul. 8, 2024.

* cited by examiner

*Primary Examiner* — Yogesh Paliwal
(74) *Attorney, Agent, or Firm* — Muncy, Geissler, Olds & Lowe, P.C.

(57) ABSTRACT

Methods for updating ephemeral keys on quick boot of a computing device, including determining, by a processor of the computing device, that a power-on transition is from a quick boot and generating, in a secure portion of the processor, a new ephemeral key for use in wrapping one or more encryption keys of a key ring for use in an unsecure portion of the processor in response to the quick boot. The secure portion of the processor may unwrap each of the one or more encryption keys of the key ring with a prior ephemeral key before wrapping the one or more encryption keys with the new ephemeral key.

19 Claims, 8 Drawing Sheets

500

502

Recognizing, By A Processor Of The Computing Device, That A Power-On Transition Is From A Quick Boot

504

Generate, In A Secure Portion Of The Processor, A New Ephemeral Key For Use In Wrapping One Or More Encryption Keys Of A Key Ring For Use In An Unsecure Portion Of The Processor In Response To The Quick Boot

SYSTEMS AND METHODS FOR ENSURING EPHEMERALITY OF ENCRYPTION KEYS

BACKGROUND

The security of computing devices can be compromised at various points and any compromise may attempt to persist on the computing device in a variety of ways. One method for protecting the security of hardware and software is to sign executable code, firmware, and hardware and then check the executable code against signing certificates before executing. This method can be expanded to chain together trust from hardware to software in which security relies on the previously launched components. The computing device may have a trust zone that has been secured and authenticated by certificates on start-up in this manner. Furthermore, to protect cryptographic keys used in unsecure or untrusted portions of the computing device, these keys may be wrapped or further encrypted by temporary keys or certificates that can be trusted because they were generated in a secure portion of the computing device.

SUMMARY

Various aspects include a method for ensuring the ephemerality of keys used to sign various runtime operations that may be implemented on a processor of a computing device. Various aspects may include determining, by a processor of the computing device, that a power-on transition is from a quick boot, and generating, in a secure portion of the processor, a new ephemeral key for use in wrapping one or more encryption keys of a key ring for use in an unsecure portion of the processor in response to the quick boot.

Some aspects may further include wrapping, in the secure portion of the processor, each of the one or more encryption keys individually with the new ephemeral key, and writing the wrapped one or more encryption keys back to the unsecure portion of the processor. Some aspects may further include generating, in the secure portion of the processor, a prior ephemeral key from a stored seed on the computing device, and unwrapping, in the secure portion of the processor, each of the one or more encryption keys of the key ring with the prior ephemeral key before wrapping the one or more encryption keys with the new ephemeral key. In some aspects, the one or more encryption keys may be written back to the key ring in a kernel of an operating system before enabling decryption of files on the processor.

Some aspects may further include copying a portion of the key ring corresponding to the one or more encryption keys from a kernel of an operating system to the secure portion of the processor. In some aspects, the new ephemeral key may be generated from a new seed in the secure portion of the processor. In some aspects, the one or more encryption keys may be used for file based encryption in the unsecure portion of the processor.

Further aspects may include a processor for use in a thermal cooling system configured to perform operations of any of the methods summarized above. Further aspects may include a thermal cooling system configured with processor-executable instructions to perform operations of any of the methods summarized above. Further aspects may include a thermal cooling system including means for performing functions of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
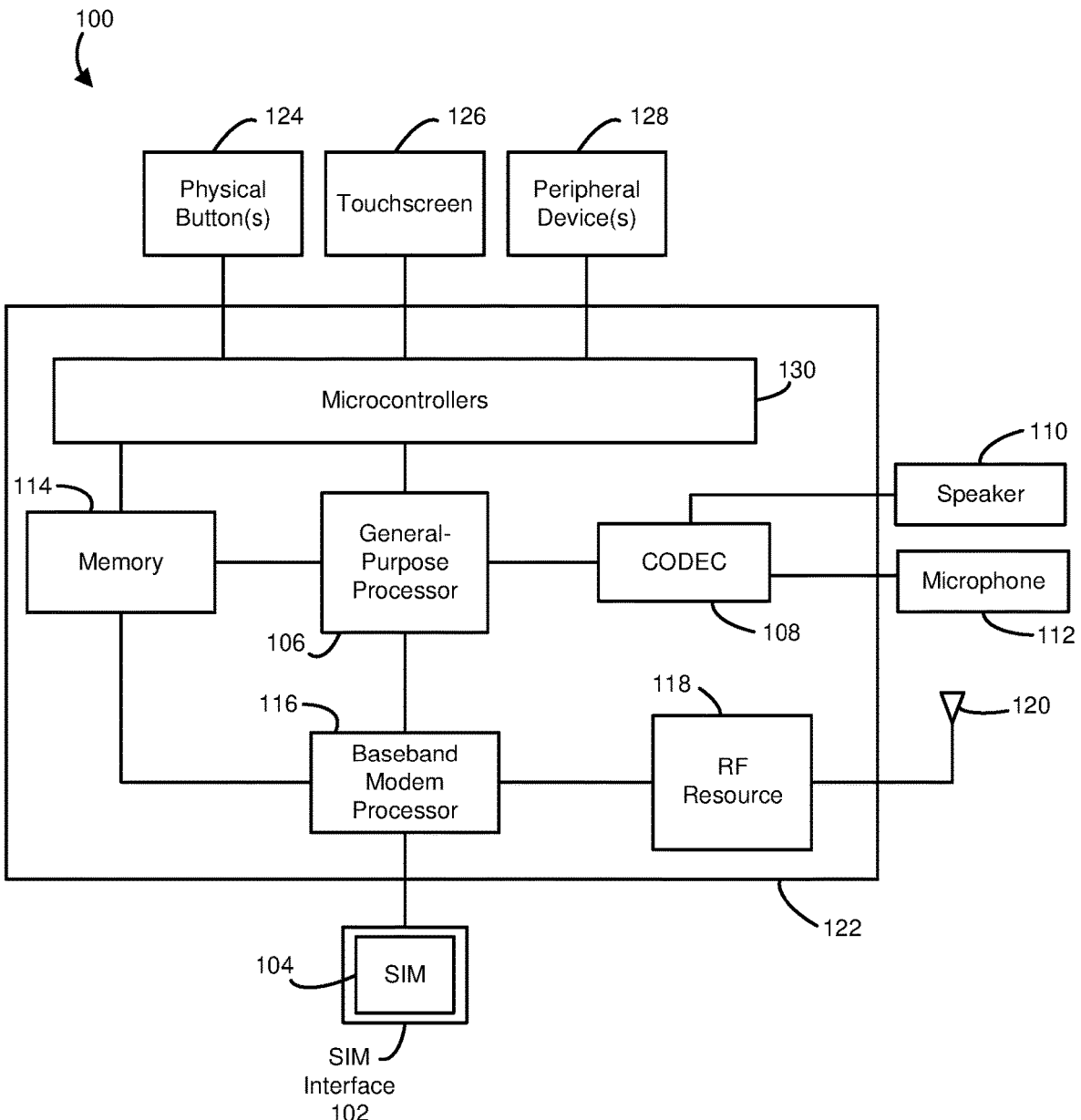
FIG. 1 is a functional block diagram of an example computing device suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods and apparatus implementing such methods for ensuring ephemerality of encryption keys after a quick boot without the need to regenerate all encryption keys. In various embodiments, a processor of a computing device may recognize when a power-on transition is from or as part of a quick boot, and generate, in a secure portion of the processor, a new ephemeral key for use in wrapping one or more encryption keys of a key ring for use in an unsecure portion of the processor in response to the quick boot.

Some embodiments may include generating and applying the new ephemeral key by unwrapping, in the secure portion of the processor, each of the one or more encryption keys of the key ring with a prior ephemeral key before wrapping the one or more encryption keys with the new ephemeral key. Some embodiments may include generating and applying the new ephemeral key by wrapping, in the secure portion of the processor, each of the one or more encryption keys individually with the new ephemeral key.

The terms "computing device" and "mobile device" are used interchangeably herein to refer to any one or all of cellular telephones, smartphones, personal or mobile multimedia players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

The term "system on chip" or the abbreviation "SOC" are used herein interchangeably to refer to a set of interconnected electronic circuits typically, but not exclusively, including a processor, a memory, and a communication interface. A processor may include a variety of different types of processors 14 and processor cores, such as a general purpose processor, a central processing unit (CPU), a digital signal processor (DSP), a graphics processing unit (GPU or GFX), an accelerated processing unit (APU), a secure processing unit (SPU), a network processor, neural network processing unit (NPU), double data rate (DDR) memory, a subsystem processor of specific components of the computing device, such as an image processor for a camera subsystem or a display processor for a display, an auxiliary processor, a single-core processor, a multicore processor, a controller, a microcontroller, and the like. A processor may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The term "quick boot" used herein may include the startup process of a device that is coming out of a power off state, where certain cold boot steps are skipped for efficiency or prior cold boot steps have been stored and are relied upon in quick boot. The term "intermediate physical address" or IPA used herein may include an intermediate memory address managed by a memory management unit (MMU) in a processor that masks virtual addresses and physical addresses for security purposes.

The term "secure portion of a processor" is used herein to refer to a hardware and firmware portion of a processor that are configured to prevent access from applications and users and are used for performing security and sensitive operations, including generating encryption keys, storing sensitive data (e.g., private encryption keys), authenticating certificates, and operations critical to protecting the processor and applications executing on the processor. In some processors (including ARM® processors) the secure portion of a processor is referred to the "trust zone," which may also be used herein. The term "trusted zone" is used herein to refer to hardware and firmware that has been verified by a certificate or other form of authentication. The term "trusted application" is used herein to refer to firmware or software for which the executable code has been verified by a certificate or other form of authentication.

A computing device may protect data stored thereon by encrypting files with a file-based encryption (FBE). This type of encryption may be applied on a file-by-file basis for one or more storage volumes and may not include some core files (e.g., kernel executables). File based encryption on a computing device may encrypt the file names and data with one or more encryption keys that may be static (e.g., remain the same after a cold reboot). Using a static decryption key (e.g., the public key of a key pair) may render the computing device vulnerable to attack because a static key could be exfiltrated and then reused for nefarious purposes by a persistent threat on the computing device. To protect against the vulnerability created by static keys, the encryption/ decryption key may be protected in transit from the secure portion of the processor or trusted zone (TZ) to the user space of the computing device by encrypting (or wrapping) the encryption key using another encryption key that is changed from time to time. This wrapping encryption key is referred to as an "ephemeral key" because using different ephemeral keys to wrap one or more static keys increases or at least maintains the ephemerality of encryption keys used on the device.

Conventionally, ephemeral keys may be re-seeded and re-generated during each cold boot to prevent the reuse of keys that may have been intercepted previously. The ephemeral keys may be generated by hardware like a hardware key master (e.g., hardware KeyMgr or a pseudo random number generator) that is in the secure portion of a processor or trusted zone of the computing device. The computing SoC may include an inline cryptographic engine (ICE) that receives the wrapped keys for file-based encryption and the ephemeral keys for unwrapping the FBE keys. The ICE may then operate to decrypt files and storage volumes as requested by the user.

Conventionally, ephemeral keys that may be used to wrap FBE keys or other keys would not be replaced in a normal quick boot and only in a cold boot. The use of quick boots has become common place, particularly on smart phones to conserve battery power and in automobiles to decrease the latency to enable the system to reach the operating state quickly. Automotive applications may enable the vehicle systems to be on and ready for use once the engine has been started. However, with each quick boot cycle, the ephemeral keys become less ephemeral by remaining static while the device is in the near but not fully shutdown state. In particular, prior to a quick boot, the memory in which encryption keys are stored may remain powered and thus could be accessed by a hacker and then used to compromise the computing device or encrypted files. Thus, a computing device that is repeatedly quick booted could be vulnerable to the same attacks that the FBE keys can under a persistent threat.

Various embodiments provide methods for ensuring and renewing the ephemerality of ephemeral keys upon quick boot. As used herein, the term "quick boot" encompasses resuming from the state of Suspend to Disk Hibernation. Various embodiments include determining, by a processor of the computing device, that a power-on transition is from a quick boot, and generating, in a secure portion of the processor, a new ephemeral key for use in wrapping one or more encryption keys of a key ring for use in an unsecure portion of the processor in response to the quick boot. This new ephemeral key may be generated from a new seed.

Various embodiments improve the security of computing devices by improving the ephemerality of FBE keys and ensuring that the quick boot process does not fail during replacement of the ephemeral keys and the re-wrapping of the FBE keys. Various embodiments improve the updating of wrapped keys in a keyring of the kernel of the operating system of the computing device. Various embodiments improve the security of the ephemeral key upon quick boot and upon awakening from deep sleep.

FIG. 1 is a functional block diagram of an example computing device 100 suitable for implementing various embodiments. With reference to FIG. 1, the computing device 100 may be a smart phone, a tablet, a personal computer, or other electronic device. The computing device 100 may include at least one subscriber identity module (SIM) interface 102, which may receive a first SIM ("SIM-1") 104 that is associated with a first subscription.

A SIM in various embodiments may be a Universal Integrated Circuit Card (UICC) that is configured with an electronic SIM (eSIM) and/or universal SIM (USIM) applications, enabling access to a variety of different networks. The UICC may also provide storage for a phone book and other applications. In a code division multiple access (CDMA) network, a SIM may be a UICC removable user identity module (R-UIM) or a CDMA subscriber identity module (CSIM) on a card. While a single SIM may connect to different networks, the subscription of the SIM may correspond to a single carrier or conglomerate of carriers.

Each SIM 104 may have a CPU, ROM, RAM, EEPROM and I/O circuits or may be configured as an electronic profile stored on computing device 100 or the baseband modem processor 116. In some embodiments, additional SIMs may be provided for use on the computing device 100 through a virtual SIM (VSIM) application that may be a part of the baseband modem processor 116 or SIM interface 102. For example, the VSIM application may implement downloaded SIMs on the computing device 300 by provisioning corresponding eSIM profiles in secure firmware.

The computing device 100 may include at least one controller (e.g., microcontroller 130), and a general-purpose processor 106, which may be coupled to a coder/decoder (CODEC) 108. The CODEC 108 may in turn be coupled to a speaker 110 and a microphone 112. The CODEC 108 may operate as an inline cryptographic engine (ICE) for encryption and decryption of data using one or more keys. The general-purpose processor (e.g., CPU) 106 may also be coupled to at least one memory 114. The memory 114 may be a non-transitory tangible processor-readable storage medium that stores processor-executable instructions. The memory 114 may include a secure memory portion and an unsecure memory portion or may include a trust zone of verified memory.

The processor-executable instructions may include routing communication data relating to a subscription though the transmit chain and receive chain of a corresponding base-band-RF resource chain. The memory 114 may store operating system (OS) as well as user application software and executable instructions. The general-purpose processor 106 and memory 114 may each be coupled to at least one baseband-modem processor 116. Each SIM 104 in the computing device 100 may be associated with a baseband-RF resource chain that includes at least one baseband-modem processor 116 and at least one radio frequency (RF) resource 118.

The RF resource 118 may include receiver and transmitter circuitry coupled to at least one antenna 120 and configured to perform transmit/receive functions for the wireless services associated with each SIM 104 of the computing device 100. The RF resource 118 may implement separate transmit and receive functionalities or may include a transceiver that combines transmitter and receiver functions. The RF resource 118 may be configured to support multiple radio access technologies/wireless networks that operate according to different wireless communication protocols. The RF resource 118 may include or provide connections to different sets of amplifiers, digital to analog converters, analog to digital converters, filters, voltage-controlled oscillators, etc. Multiple antennas 120 and/or receive blocks may be coupled to the RF resource 118 to facilitate multimode communication with various combinations of antenna and receiver/transmitter frequencies and protocols (e.g., LTE, Wi-Fi, Bluetooth and/or the like).

The baseband-modem processor of a computing device 100 may be configured to execute software including at least one modem stack associated with at least one SIM. SIMs and associated modem stacks may be configured to support a variety of communication services that fulfill different user requirements. Further, a particular SIM may be provisioned with information to execute different signaling procedures for accessing a domain of the core network associated with these services and for handling data thereof-which is also called carrier personalization.

In some embodiments, the general-purpose processor 106, memory 114, baseband-modem processor 116, and RF resource 118 may be included in a system-on-chip (SoC) device 122. The SIMs 104 and their corresponding interface(s) 102 may be external to the system-on-chip device 122. Further, various input and output devices may be coupled to components of the system-on-chip device 122, such as interfaces or controllers. Example user input components suitable for use in the computing device 100 may include, but are not limited to, a keypad 124, a touchscreen 126, such as a beveled edge touchscreen.

In some embodiments, the general-purpose processor 306 may be coupled to one or more peripheral devices 128 (e.g., sensors, data storage). The peripheral device(s) 128 may provide an output that includes information about the environment around the computing device 100. For example, the computing device may include an ambient light sensor configured to sense and intensity of ambient light incident on the ambient light sensor, and to provide an output to the general-purpose processor 106 including information about the intensity of the ambient light.

Figure 2:
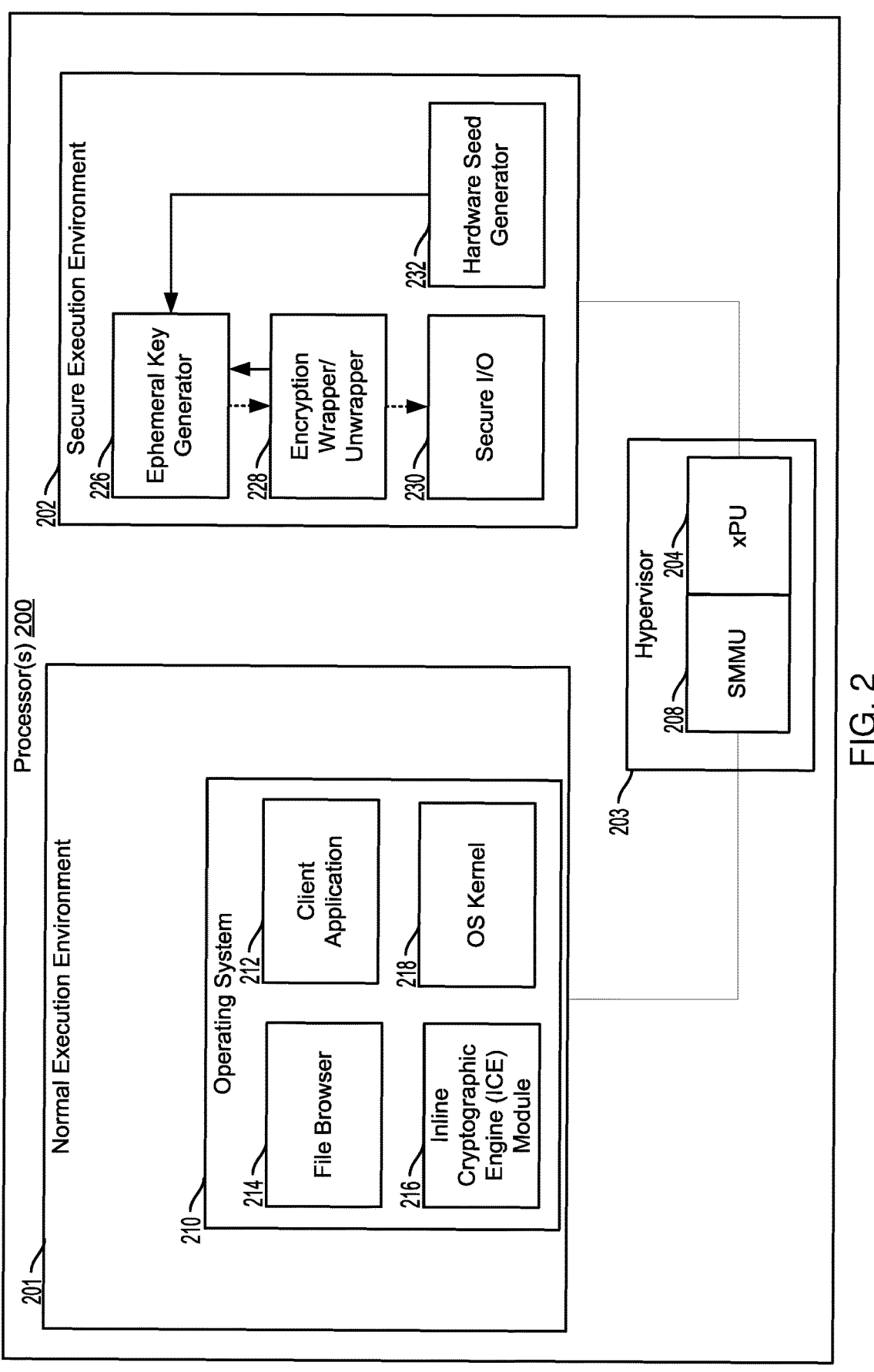
FIG. 2 is a component block diagram illustrating an example system for ensuring ephemerality of keys according to some embodiments.

FIG. 2 illustrates an example of components and software-implemented function modules of a computing device and signaling between the components for secure user interface user interaction response and secure user interface presentation. The components and software-implemented function modules of the computing device (e.g., computing device 100 in FIG. 1) may include a normal execution environment 201 and a secure execution environment 202 of a processor (e.g., general purpose processor 106, baseband modem processor 116, controllers/microcontrollers 122, 130). Physical components may further include a resource protection unit (XPU) 204, a hardware seed generator 232, a system memory management unit (SMMU) 208, and an inline cryptographic engine (ICE) module 216.

The secure execution environment 202 may include further components and software-implemented function modules, which may be implemented as software running in the secure execution environment 202 of one or more processor(s) 200. The secure execution environment 202 may have been verified and authenticated by a chain of trust from boot based on hardware (immutable) certificates. A portion of the trust zone of the computing device may be the secure execution environment 202. These components and software-implemented function modules may include an ephemeral key generator 226, an encryption wrapper/unwrapper 228, a secure input and output (I/O) interface 230, and a hardware seed generator 232.

The hardware seed generator 232 may generate a seed (e.g., a random sequence of bits or numbers) that may be transmitted to the ephemeral key generator 226 to form the basis for an ephemeral key. Secure keys require a sufficiently (substantially) random beginning code from a secure (non-compromised) source such as the hardware seed generator 232. The ephemeral key generator 226 may then generate, from the seed, one or more ephemeral keys which may be a predetermined length (e.g., 256 bits). The generated ephemeral key may be output via secure I/O 230 to the hypervisor 203 or directly to SMMU 208, xPU 204, or the ICE module 216. The generated ephemeral key may be applied to the FBE keys directly in the encryption wrapper/unwrapper 228 so that the FBE keys are wrapped in a secure environment or dedicated hardware, like a keymaster or hardware key manager (HWKM). The wrapped FBE keys and the ephemeral key portion that is used for unwrapping may be sent to the secure execution environment or HWKM to unwrap the FBE, which gets used for decrypting files in the ICE hardware.

The normal execution environment 201 may include components and software-implemented function modules, which may be implemented as software running in the normal execution environment 201 of a processor(s) 200. These components and software-implemented function modules may include the operating system (OS) 210, the file browser 214, a client application 212, an inline cryptographic engine (ICE) module 216, an OS kernel 218 that forms the core of the operating system and may include a keyring. A user may select a file for viewing or opening in the file browser application 214 or via client application 212 and as a result the encrypted file may be retrieved from an encrypted volume and decrypted in the ICE module 216. The decryption of the encrypted volume may involve unwrapping the FBE key with the ephemeral key in the ICE module 216 or transmitting the FBE key to the secure execution environment 202 to unwrap the FBE key and return it to the ICE module 216, where the unwrapped FBE is then used to decrypt the file. A decrypted file may then be displayed to the user or inputted into a client application 212. Further description of the FBE process is described with respect to FIG. 3 below.

The ICE module 216 may receive a data request signal from the file browser and respond by sending a cryptographic key request to the secure execution environment or a key master or a keyring of the OS kernel 218 for one or more cryptographic keys for implementing the data request. The secure execution environment 202 or secure I/O 230 may determine that cryptographic key access is disabled for the one or more cryptographic keys and return an error signal to the ICE module 216. The ICE module 216 may return an error signal to a client application 212 or the OS kernel 218.

The operating system 210 may include an OS kernel 218 that operates closest to the hardware of the processor(s) 200. The OS 210 or the normal execution environment 201 may communicate with the secure execution environment 202 via the hypervisor 203 or other virtual machine (e.g., ANDROID virtual machine) for security purposes. The hypervisor may operate together with the SMMU 208 to provide security for system memory.

The hypervisor 203 may use memory page tables to translate a virtual address of the client application's dedicated memory space to a physical address of the memory to implement the memory access request. The hypervisor 203 may set a memory access flag in the one or more page tables for one or more memory locations associated with the application's dedicated memory space. For example, the one or more page tables may be stored in a memory (e.g., memory 114 in FIG. 1) and locations in the memory may store address translation data and associated memory access flag data.

The memory address translation may include two stages with an intermediate physical address (IPA) associated with the hypervisor 203 or virtual machine. A virtual address (VA) may be passed into the SMMU 208 from the client application 212 in user space and may be translated into an IPA by the SMMU 208 and then into a physical address by the SMMU 208 in separate stages. Both stages can be used to implement address translation and access control to different parts of memory.

Stage 1 of the SMMU 208 allows a first level of address translation which is used by the OS (e.g., Linux) to manage the virtual address space provided to each user space process and to its own virtual address space. Stage 2 of the SMMU 208 enables a second address translation on the output address of the stage 1, resulting in a physical address (PA). The stage 2 translation can be used by hypervisors to control and translate memory accesses from all guest virtual machines (GVMs). When both stages of translation are enabled, the output address of stage 1 is called an intermediate physical address (IPA). The processor(s) 200 and the execution environments 201/202 thereon may not connect via a hypervisor 203 and may simply rely on the SMMU 208 and resource protection unit (XPU) 204 or other connections for communication. In the absence of a hypervisor 203, only one stage of memory address translation may be performed in the SMMU 208 (e.g., from virtual to physical). The second stage enables the hypervisor to also perform access controls via the SMMU 208.

Figure 3:
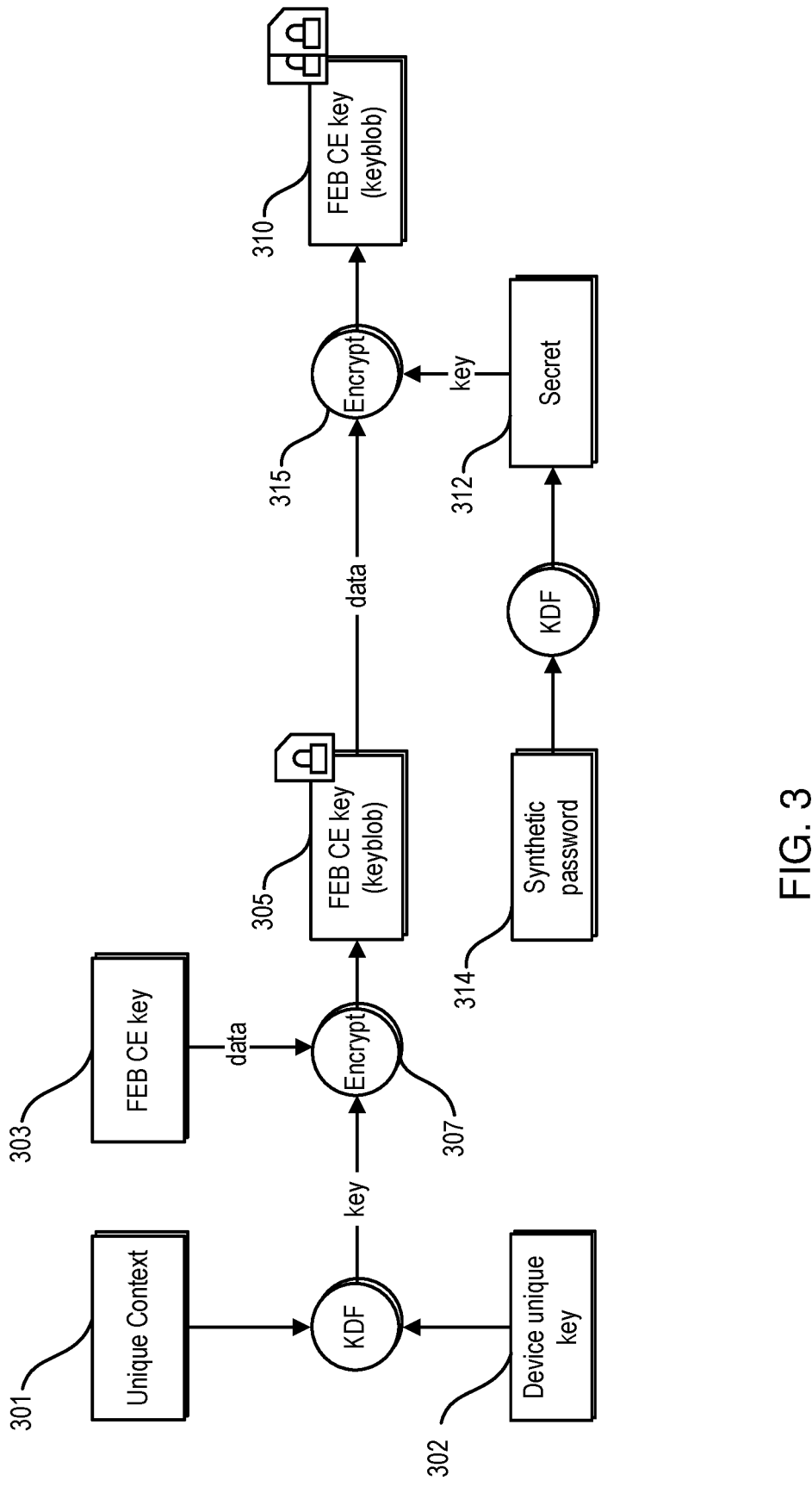
FIG. 3 is a component block diagram illustrating an example system for file-based encryption using ephemeral keys according to some embodiments.

FIG. 3 is a process diagram for a file-based encryption (FBE) implementation according to some embodiments. A device unique key 302 and a unique context 301 (e.g., seed or user credential) may be input to a key derivation function (KDF) or key generator which generates a key (e.g., FBE key) that is sent to be encrypted or wrapped 307 by the FBE credential encrypted (CE) keys 303. The FBE CE key 303 may be generated by a keymaster or hardware key manager (HWKM). This results in an encrypted blob 305. A synthetic password (e.g., user password) 314 may be used to generate a secret password (e.g., hashed password) 312 which may optionally lock or encrypt 315 the FBE key (keyblob) 310 at the user level.

The keymaster or hardware key manager (HWKM) may generate a per-boot/per-class/per-user ephemeral key (EK) to wrap the FBE class keys. This ephemeral key may be cached in a keyring of the OS kernel or a specialized function (e.g., ANDROID vold). When the user unlocks the computing device after a reboot using the credentials, the synthetic password may be retrieved. The keymaster decrypts the FBE keyblob to retrieve the FBE class key and uses the appropriate EK to wrap the FBE class key. This wrapped key may then be cached in the keyring of the OS kernel. When the OS kernel requires this key to read or write a file, it calls into the secure environment which unwraps the wrapped key, derives the decryption key (e.g., a 64-byte AES256-XTS), and programs it in into the ICE module 216.

Figure 4:
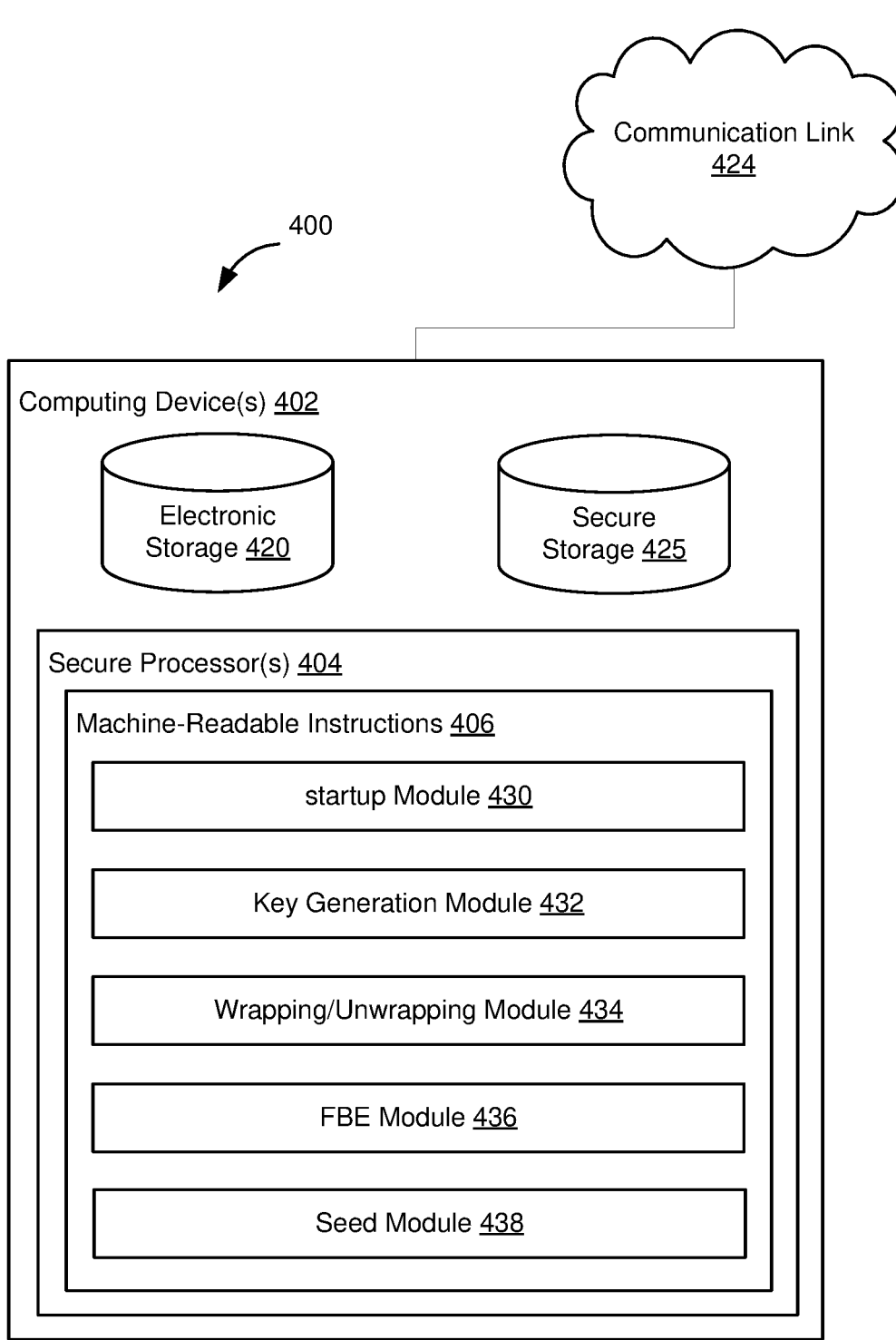
FIG. 4 is a component block diagram illustrating an example system for ensuring ephemerality of keys according to some embodiments.

FIG. 4 is a component block diagram illustrating an example system 400 for ensuring ephemerality of an ephemeral key for wrapping an FBE key according to some embodiments. With reference to FIGS. 1-4, the system 400 may include one or more computing devices 402 which may communicate via a wireless communication link 424 with external resources. In some implementations, some or all of the functionality attributed herein to external resources may be provided by resources included in the system 400. The system 400 may include a plurality of hardware, software, and/or firmware components operating together to provide the functionality attributed herein to the processor(s) 404 or 200.

The computing device 402 may include electronic storage 420 and secure storage 425 that may be configured to store information related to functions implemented by a startup module 430, a key generation module 432, a wrapping/ unwrapping module 434, a FBE module 436, a seed module 438, and any other instruction modules. These modules of machine-readable instructions 406 may be executed on secure processor(s) 404 or may be called in the secure execution environment 202 or the normal execution environment 201 of FIG. 2.

The electronic storage 420 and secure storage 425 may include non-transitory storage media that electronically stores information. The electronic storage 420 and secure storage 425 may include one or both of system storage that is provided integrally (i.e., substantially non-removable) within the processors 200 or 122 (e.g., within the same SoC or SIP) and/or removable storage that is removably connectable to the processor(s) 200/122 via, for example, a port (e.g., a universal serial bus (USB) port, a firewire port, etc.) or a drive (e.g., a disk drive, etc.). In various embodiments, electronic storage 420 and secure storage 425 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media 420. The electronic storage 420 and secure storage 425 may store software algorithms, information determined by processor(s) 422, and/or other information that enables the processor(s) 200/122 to function as described herein.

The computing device 402 may include a secure processor 404 or secure portion of a processor that may be configured by machine-readable instructions 406 to perform operations of various embodiments. Machine-readable instructions 406 may include one or more instruction modules. The instruction modules may include computer program modules. The instruction modules may include one or more of a startup module 430, a key generation module 432, a wrapping/unwrapping module 434, a FBE module 436, a seed module 438, and other instruction modules (not illustrated).

The secure processor 404 may include one of more local processors that may be configured to provide information processing capabilities in the computing device 100. As such, the secure processor 404 may include one or more of a digital processor, an analog processor, a digital circuit designed to process information, an analog circuit designed to process information, a state machine, and/or other mechanisms for electronically processing information. Although the secure processor 404 is shown in FIG. 4 as a single entity, this is for illustrative purposes only. In some embodiments, the secure processor 404 may include a plurality of processing units. These processing units may be physically located within the same device, or the modem processor 404 may represent processing functionality of a plurality of devices distributed in the processor(s) 200 or components of computing device 100.

In some embodiments, the secure processor(s) 404 executing the startup module 430 may be configured to detect that a quick boot has been initiated by the computing device 100 and may perform one or more authentication processes to verify the machine-readable instructions 406 and the secure processors (e.g., via certificates). The startup module 430 may detect that the computing device was in a deep sleep mode or hibernate mode and perform various authentication processes to ensure security of the secure execution environment (e.g., trust zone) in this situation. The startup module 430 may also detect when the computing device is being cold booted from a complete shutdown of the device and may perform authentication processes to ensure or continue the chain of trust.

In some embodiments, the secure processor(s) 404 executing the key generation module 432 may be configured to generate one or more encryption keys which may be based on seeds provided by seed module 438. In some embodiments, the secure processor 404 executing the key generation module 432 may be configured to generate, in a secure portion of the processor, a new ephemeral key for use in wrapping one or more encryption keys of a key ring for use in an unsecure portion of the processor in response to the determination that the computing device is being quick booted. In some embodiments, the secure processor 404 executing the key generation module 432 may be configured to generate, in the secure portion of the processor, a prior ephemeral key from a stored seed on the computing device. The key generation module 432 may be configured to generate the prior ephemeral key from the stored seed on the computing device upon determination that the computing device is awakening from hibernation (e.g., not quick boot or cold boot).

In some embodiments, the modem processor 404 executing the wrapping/unwrapping module 434 may be configured to use the generated ephemeral keys (EK) to encrypt or add an encryption layer to one or more FBE keys. In some embodiments, the processor 404 executing the wrapping/unwrapping module 434 may be configured to unwrap one or more FBE keys using ephemeral keys upon request by the ICE module 216. In some embodiments, the secure processor 404 executing the wrapping/unwrapping module 434 may be configured to wrap (or unwrap and then wrap) one or more FBE keys upon determination of a quick boot.

In some embodiments, the secure processor 404 executing the FBE module 436 may be configured to generate FBE keys which are separate from ephemeral keys. The FBE keys may be generated based on a seed from seed module 438, a user password, and other context (e.g., device specific). The FBE module 436 may communicate with the ICE module 216 which performs the file decryption and encryption to deliver FBE keys and secure FBE keys, since the ICE module 216 is in an untrusted zone. The FBE module 436 may detect FBE key misuse or cracking attempts and alert the user.

In some embodiments, the secure processor 404 executing the seed module 438 may be configured to generate a random seed or substantially random seed for input into a key generator (e.g., key generation module 432). The seed module 438 may be configured to generate a seed or salt for a hash and may be configured as a random number generator or a pseudo-random number generator. The seed generator 438 may be embodied as a dedicated hardware circuit.

The description of the functionality provided by the different modules 430-438 is for illustrative purposes, and is not intended to be limiting, as any of modules 430-438 may provide more or less functionality than is described. For example, one or more of modules 430-438 may be eliminated, and some or all of its functionality may be provided by other ones of modules 430-438. As another example, secure processor 404 may execute one or more additional modules that may perform some or all of the functionality attributed below to one of modules 430-438. One or more modules 430-438 may form a hardware keymaster and may be embodied in hardware or read-only firmware.

Figure 5:
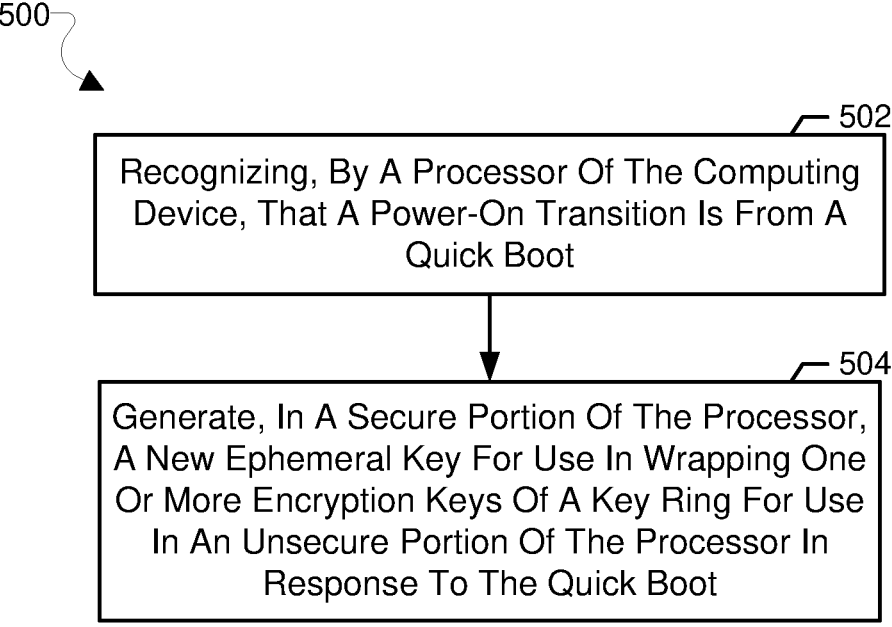
FIG. 5 is a process flow diagram illustrating a method 500 for ensuring ephemerality of keys according to some embodiments.

FIG. 5 is a process flow diagram illustrating an example method 500 for ensuring ephemerality of a key for wrapping an FBE key. With reference to FIGS. 1-5, operations of the method 500 may be performed by a processor of a computing device according to various embodiments. In some embodiments, means for performing operations of the method 500 may be a processor (e.g., 122, 130, 106, 200) of the computing device (e.g., 100), and/or the like.

In block 502, the processor of the computing device may recognize (e.g., determine) that a power-on transition is from a quick boot operation. The processor may recognize or determine that a quick boot operation is occurring based on a flag set by the processor or by the calling function. In some embodiments, the quick boot may eliminate one or more processes of the cold boot while ensuring ephemerality of ephemeral keys.

In block 504, the processor may generate, in a secure portion of the processor, a new ephemeral key for use in wrapping one or more encryption keys of a key ring for use in an unsecure portion of the processor in response to the quick boot. In some embodiments, the new ephemeral key may be generated from a new seed. In some embodiments, the one or more encryption keys may be used for file-based encryption in the unsecure portion of the processor to encrypt one or more digital files.

Figure 6:
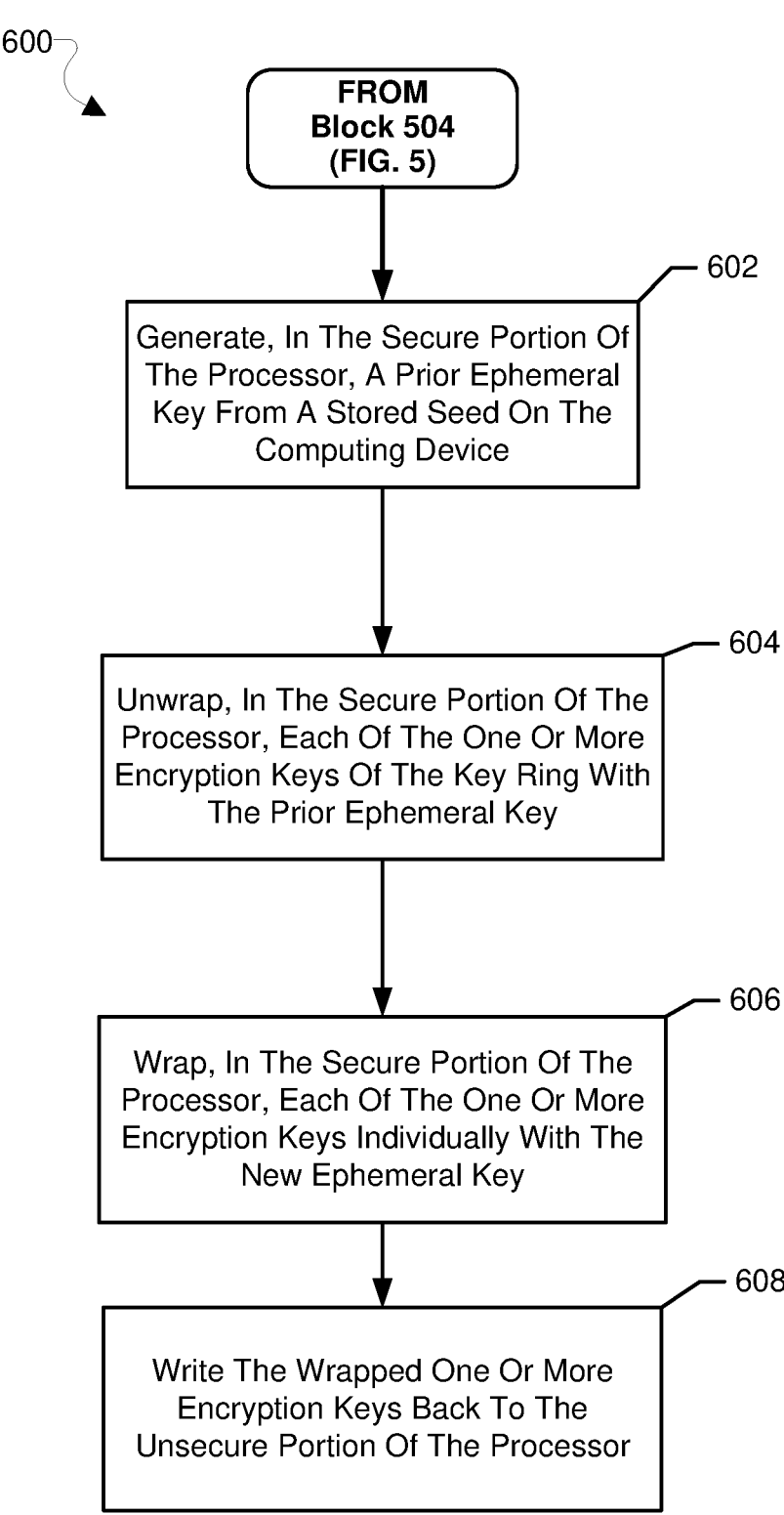
FIG. 6 is a process flow diagram illustrating a method 600 for ensuring ephemerality of keys according to some embodiments.

FIG. 6 is a process flow diagram illustrating an example method 600 for ensuring ephemerality of ephemeral keys after quick boot. With reference to FIGS. 1-6, operations of the method 600 may be performed by a processor of a computing device according to various embodiments. In some embodiments, means for performing operations of the method 600 may be a processor (e.g., 122, 130, 106, 200) of the computing device (e.g., 100), and/or the like.

Following the operations in block 504 of the method 500, the secure portion of the processor may generate a prior ephemeral key from a stored seed on the computing device in block 602. The secure portion of the processor may also use the saved seed to regenerate the prior ephemeral key when the processor determines that the computing device was in deep sleep or the like. Regenerating an ephemeral key may be more secure than using a stored ephemeral key because tampering with the stored ephemeral key may be a vector for locking or destroy the device (e.g., by ransomware).

In block 604, the secure portion of the processor may unwrap each of the one or more encryption keys of a key ring with the prior ephemeral key. To extract the FBE key for re-wrapping, the secure portion of the processor may unwrap the FBE key based on the prior ephemeral key which was regenerated in block 502 for security purposes. The unwrapping operation may include decrypting the FBE key that was encrypted with the prior ephemeral key prior to shutdown of the computing device. The FBE keys or keyring from the OS kernel that is unwrapped may be a copy of those FBE keys or the keyring, which may enable the quick boot process to continue to use the rest of the keyring (which may or may not be wrapped by ephemeral keys).

In block 606, the secure portion of the processor may wrap each of the one or more encryption keys individually with the new ephemeral key. In some embodiments, the secure portion of the processor may iterate through for each key and unwrap, then wrap with the new ephemeral key. In some embodiments, the secure portion of the processor may unwrap all the keys (e.g., FBE keys) wrapped by a prior ephemeral key and then wrap all those keys, individually, with the new ephemeral key. In other words, the re-wrapping operation may be performed as a batch or as an iterative loop.

In block 608, the secure portion of the processor may write the wrapped (re-wrapped) one or more encryption keys back to the unsecure portion of the processor. In some embodiments, the one or more encryption keys may be written back to the key ring in a kernel of the processor (or operating system) before enabling decryption of files on the processor. In some embodiments, the one or more encryption keys are used for file-based encryption in the unsecure portion of the processor.

Figure 7:
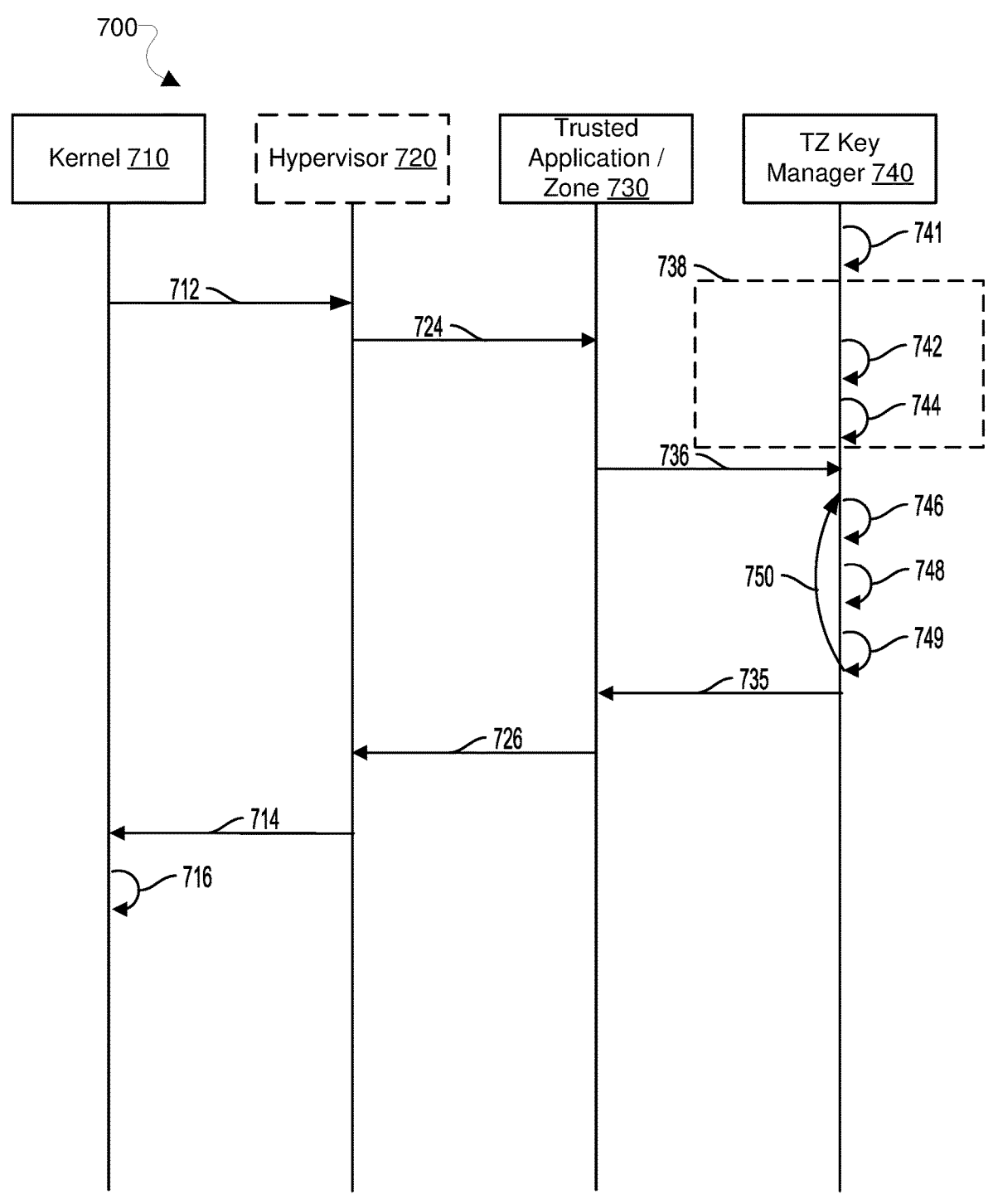
FIG. 7 is a process timing diagram illustrating elements of a process of ensuring ephemerality of keys according to some embodiments.

FIG. 7 illustrates data transfers and operations performed within a processor of re-wrapping one or more keys with a new ephemeral key to ensure ephemerality of keys according to an example embodiments. With reference to FIGS. 1-7, operations of the process 700 may be performed by a processor of a computing device according to various embodiments. In some embodiments, means for performing operations of the process 700 may be a processor (e.g., 122, 130, 106, 200) of the computing device (e.g., 100), and/or the like.

The kernel 710 may contain or manage a keyring having multiple encryption keys, passwords, or hashes, which may be stored as a table or list, for example. The kernel 710 may copy, in process 712, the keyring or a portion thereof (e.g., containing the FBE keys) to the hypervisor 720, if present, or to the trusted zone or application 730, if not present (e.g., no virtual machine). The hypervisor, if present, may then transmit, in process 724, the copied keyring to the trusted application or zone 730. The process 712 and process 724 may be a command of function call to a secure monitor (SMC) to upgrade a keyring.

In process 742, a trust zone key manager (or HWKM) 740 operating on the processor or computing device may retrieve a saved seed of an ephemeral key from secure memory. In process 744, a trust zone key manager (or HWKM) may generate (or regenerate) a prior ephemeral key from the retrieved seed and insert the regenerated ephemeral key into a slot (e.g., slot V) of the HWKM slot 740 (e.g., slot V). The trust zone key manager (or HWKM) 740 may then receive a command 736 to upgrade the keyring from the secure monitor or other secure execution environment manager. Upon a power on from hibernation (not quick boot), the computing device may only refresh the ephemeral keys by executing processes 742 and 744 (together refresh process 738) and may then operate based on the prior ephemeral keys (e.g., instead of regenerating ephemeral keys).

Based on the command 736 to upgrade the keyring or a portion thereof, the trust zone key manager (or HWKM) 740 may unwrap one or more keys in the keyring using the prior ephemeral key in process 746. Then for the one or more keys (e.g., FBE keys), the trust zone key manager (or HWKM) 740 may retrieve, in process 748, a new ephemeral wrapping key that has been generated (upon determination of quick boot) in process 741. The new ephemeral wrapping key may have been stored in slot X of the trust zone key manager HWKM. The trust zone key manager (or HWKM) 740 may then wrap the one or more keys that were stored on the keyring and unwrapped in process 746. The one or more unwrapped keys may be wrapped in process 749 based on the new ephemeral key and copied into their original slot in the keyring (e.g., slot W).

In some embodiments, where multiple keys require re-wrapping (e.g., FBE keys for multiple device profiles-work, home), the processes 746, 748, and 749 may be repeated in loop 750 for each of the keys. The loop 750 may use the same or different prior ephemeral key(s) to unwrap in a following iteration and may use the same or different new ephemeral key(s) wrap in the following iteration. Each of the keys re-wrapped in each iteration of loop 750 may be stored in a separate slot of the keyring replacing the prior wrapped ephemeral key in each corresponding slot. When all of the keys that are to be re-wrapped have been wrapped with a new ephemeral key, the copied keyring may be transmitted, in process 735, back to the trusted application or zone 730 and on to the hypervisor 720 in process 726, and on to the kernel 710 in process 714. The kernel 710 may then over-write the keyring, in process 716, it had stored at power on or at least a portion thereof. The keys of the keyring that were wrapped with ephemeral keys have been upgraded upon quick boot to new ephemeral keys to ensure the ephemerality of the wrappings of these keys.

Figure 8:
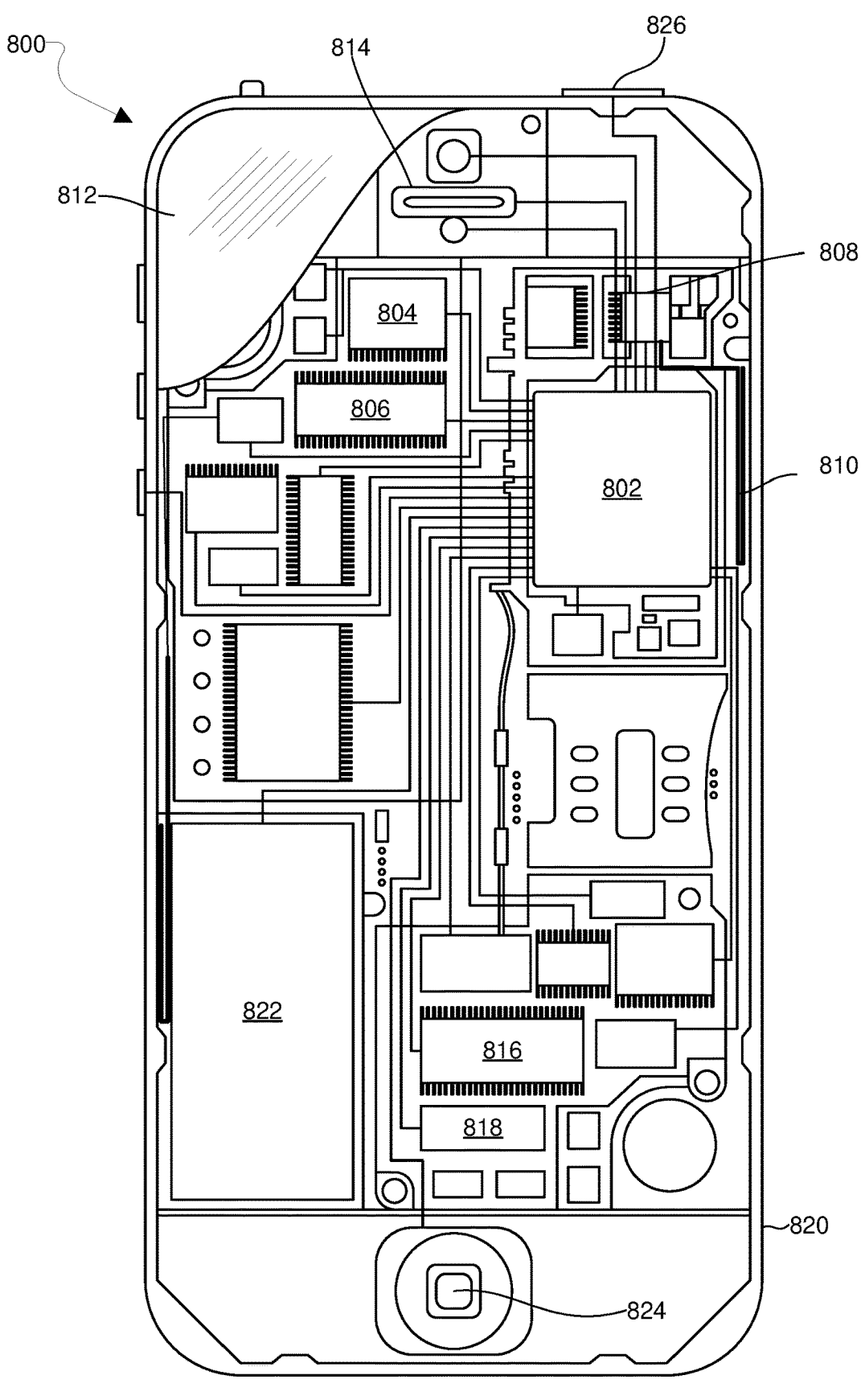
FIG. 8 is a component block diagram illustrating an example computing device suitable for implementing various embodiments.

Various embodiments (including, but not limited to, embodiments described above with reference to FIGS. 1-8) may be implemented in mobile computing devices, an example of which suitable for use with the various embodiments is illustrated in FIG. 8 as a smartphone user equip-ment (UE). The UE 800 may include a processor 802 coupled to a touchscreen controller 804 and an internal memory 806. The processor 802 may be one or more multicore integrated circuits designated for general or spe-cific processing tasks. The internal memory 806 may be volatile or non-volatile memory and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, embedded DRAM, non-volatile flash memory, UFS, SDCC, etc. The touch-screen controller 804 and the processor 802 may also be coupled to a touchscreen panel 812, such as a resistive-sensing touchscreen, capacitive-sensing touchscreen, infra-red sensing touchscreen, etc. Additionally, the display of the UE 800 need not have touch screen capability.

The UE 800 may have one or more radio signal trans-ceivers 808 (e.g., Peanut, Bluetooth, ZigBee, Wi-Fi, RF radio) and antennae 810, for sending and receiving commu-nications, coupled to each other and/or to the processor 802. The transceivers 808 and antennae 810 may be used with the above-mentioned circuitry to implement the various wire-less transmission protocol stacks and interfaces. The UE 800 may include a cellular network wireless modem chip 816 that enables communication via a cellular network and is coupled to the processor 802.

The UE 800 may include a peripheral device connection interface 818 coupled to the processor 802. The peripheral device connection interface 818 may be singularly config-ured to accept one type of connection or may be configured to accept various types of physical and communication connections, common or proprietary, such as Universal Serial Bus (USB), FireWire, Thunderbolt, or PCIe. The peripheral device connection interface 818 may also be coupled to a similarly configured peripheral device connec-tion port (not shown).

The UE 800 may also include speakers 814 for providing audio outputs. The UE 800 may also include a housing 820, constructed of a plastic, metal, or a combination of materi-als, for containing all or some of the components described herein. The UE 800 may include a power source 822 coupled to the processor 802, such as a disposable or rechargeable battery. The rechargeable battery may also be coupled to the peripheral device connection port to receive a charging current from a source external to the UE 800. The UE 800 may also include a physical button 824 for receiving user inputs. The UE 800 may also include a power button 826 for turning the UE 800 on and off.

Various embodiments illustrated and described are pro-vided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations disclosed herein may be substituted for or com-bined with one or more operations of the methods and operations disclosed herein.

Implementation examples are described in the following paragraphs. While some of the following implementation examples are described in terms of example methods, further example implementations may include: the example meth-ods discussed in the following paragraphs implemented by a computing device including a processor configured to perform operations of the methods of the following imple-mentation examples; the example methods discussed in the following paragraphs implemented by a computing device including means for performing functions of the methods of the following implementation examples; the example meth-ods discussed in the following paragraphs implemented by a processor for use in a computing device in which the processor is configured to perform operations of the methods of the following implementation examples; and the example methods discussed in the following paragraphs may be implemented as a non-transitory processor-readable storage medium having stored thereon processor-executable instruc-tions configured to cause a processor of a computing device to perform the operations of the methods of the following implementation examples.

Example 1. A method for updating ephemeral keys on quick boot of a computing device, including: recognizing, by a processor of the computing device, that a power-on transition is from a quick boot; and generating, in a secure portion of the processor, a new ephemeral key for use in wrapping one or more encryption keys of a key ring for use in an unsecure portion of the processor in response to the quick boot.

Example 2. The method of example 1, further including: wrapping, in the secure portion of the processor, each of the one or more encryption keys individually with the new ephemeral key; and writing the wrapped one or more encryption keys back to the unsecure portion of the proces-sor.

Example 3. The method of example 2, further including: generating, in the secure portion of the processor, a prior ephemeral key from a stored seed on the computing device; and unwrapping, in the secure portion of the processor, each of the one or more encryption keys of the key ring with the prior ephemeral key before wrapping the one or more encryption keys with the new ephemeral key.

Example 4. The method of either of examples 2 or 3, in which the one or more encryption keys are written back to the key ring in a kernel of an operating system before enabling decryption of files on the processor.

Example 5. The method of any of examples 1-4, further including copying a portion of the key ring corresponding to the one or more encryption keys from a kernel of an operating system to the secure portion of the processor.

Example 6. The method of any of examples 1-5, in which the new ephemeral key is generated from a new seed in the secure portion of the processor.

Example 7. The method of any of examples 1-6, in which the one or more encryption keys are used for file based encryption in the unsecure portion of the processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, processor-executable software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a processor. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein but is to be accorded the widest scope consistent with the following claims and the principles and novel features disclosed herein.

What is claimed is:

1. A method for updating ephemeral keys on quick boot of a computing device, comprising:

recognizing, by a processor of the computing device, that a power-on transition is from a quick boot;

generating, in a secure portion of the processor, a new ephemeral key for use in wrapping one or more encryption keys of a key ring for use in an unsecure portion of the processor in response to the quick boot;

generating, in the secure portion of the processor, a prior ephemeral key from a stored seed on the computing device;

unwrapping, in the secure portion of the processor, each of the one or more encryption keys of the key ring with the prior ephemeral key;

wrapping, in the secure portion of the processor, each of the one or more encryption keys individually with the new ephemeral key; and writing the wrapped one or more encryption keys back to the unsecure portion of the processor.

2. The method of claim 1, wherein the one or more encryption keys are written back to the key ring in a kernel of an operating system before enabling decryption of files on the processor.

3. The method of claim 1, further comprising:

copying a portion of the key ring corresponding to the one or more encryption keys from a kernel of an operating system to the secure portion of the processor.

4. The method of claim 1, wherein the new ephemeral key is generated from a new seed in the secure portion of the processor.

5. The method of claim 1, wherein the one or more encryption keys are used for file based encryption in the unsecure portion of the processor.

6. A computing device, comprising:

a processor having a secure portion and an unsecure portion, wherein the processor is configured to:

recognize that a power-on transition is from a quick boot;

generate, in the secure portion, a new ephemeral key for use in wrapping one or more encryption keys of a key ring for use in the unsecure portion in response to the quick boot generate, in the secure portion of the processor, a prior ephemeral key from a stored seed on the computing device;

unwrap, in the secure portion of the processor, each of the one or more encryption keys of the key ring with the prior ephemeral key;

wrap, in the secure portion of the processor, each of the one or more encryption keys individually with the new ephemeral key; and write the wrapped one or more encryption keys back to the unsecure portion of the processor.

7. The computing device of claim 6, wherein the processor is further configured such that the one or more encryption keys are written back to the key ring in a kernel of an operating system before enabling decryption of files on the processor.

8. The computing device of claim 6, wherein the processor is further configured to:

copy a portion of the key ring corresponding to the one or more encryption keys from a kernel of an operating system to the secure portion.

9. The computing device of claim 6, wherein the processor is further configured such that the new ephemeral key is generated from a new seed in the secure portion.

10. The computing device of claim 6, wherein the processor is further configured such that the one or more encryption keys are used for file based encryption in the unsecure portion.

11. A processor for use in a computing device, the processor having a secure portion and an unsecure portion, wherein the processor is configured to:

recognize that a power-on transition is from a quick boot;

generate, in the secure portion, a new ephemeral key for use in wrapping one or more encryption keys of a key ring for use in the unsecure portion in response to the quick boot generate, in the secure portion of the processor, a prior ephemeral key from a stored seed on the computing device;

unwrap, in the secure portion of the processor, each of the one or more encryption keys of the key ring with the prior ephemeral key;

wrap, in the secure portion of the processor, each of the one or more encryption keys individually with the new ephemeral key; and write the wrapped one or more encryption keys back to the unsecure portion of the processor.

12. The processor of claim 11, wherein the processor is further configured such that the one or more encryption keys are written back to the key ring in a kernel of an operating system before enabling decryption of files on the processor.

13. The processor of claim 11, wherein the processor is further configured to:

copy a portion of the key ring corresponding to the one or more encryption keys from a kernel of an operating system to the secure portion.

14. The processor of claim 11, wherein the processor is further configured such that the new ephemeral key is generated from a new seed in the secure portion.

15. The processor of claim 11, wherein the processor is further configured such that the one or more encryption keys are used for file based encryption in the unsecure portion.

16. A computing device, comprising:

means for recognizing that a power-on transition is from a quick boot;

means for generating a new ephemeral key in a secure portion for use in wrapping one or more encryption keys of a key ring for use in an unsecure portion in response to the quick boot;

means for generating, in the secure portion of the processor, a prior ephemeral key from a stored seed on the computing device;

means for unwrapping, in the secure portion of the processor, each of the one or more encryption keys of the key ring with the prior ephemeral key;

means for wrapping, in the secure portion of the processor, each of the one or more encryption keys individually with the new ephemeral key; and means for writing the wrapped one or more encryption keys back to the unsecure portion of the processor.

17. The computing device of claim 16, wherein the one or more encryption keys are written back to the key ring in a kernel of an operating system before enabling decryption of files.

18. The computing device of claim 16, further comprising:

means for copying a portion of the key ring corresponding to the one or more encryption keys from a kernel of an operating system to the secure portion.

19. The computing device of claim 16, wherein the new ephemeral key is generated from a new seed in the secure portion.

* * * * *